No. 802,366. PATENTED OCT. 24, 1905.
W. G. BIXBY.
LATHE.
APPLICATION FILED JUNE 7, 1899.
9 SHEETS—SHEET 5.
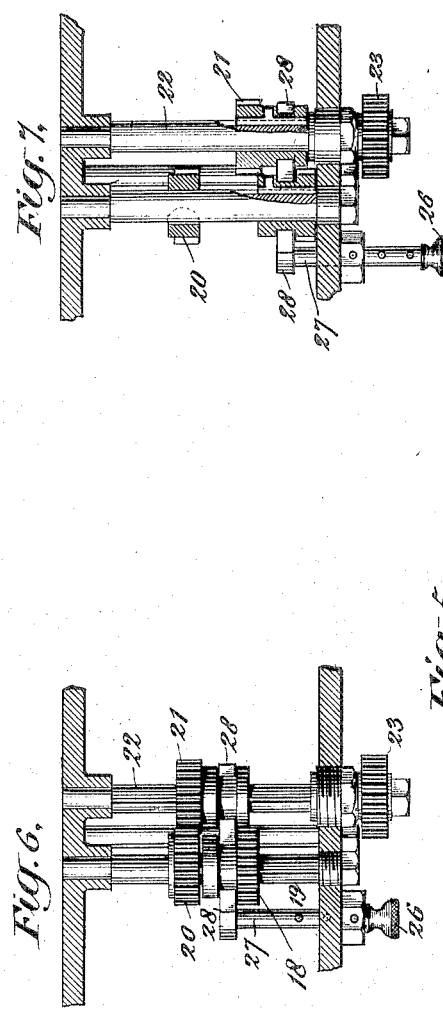
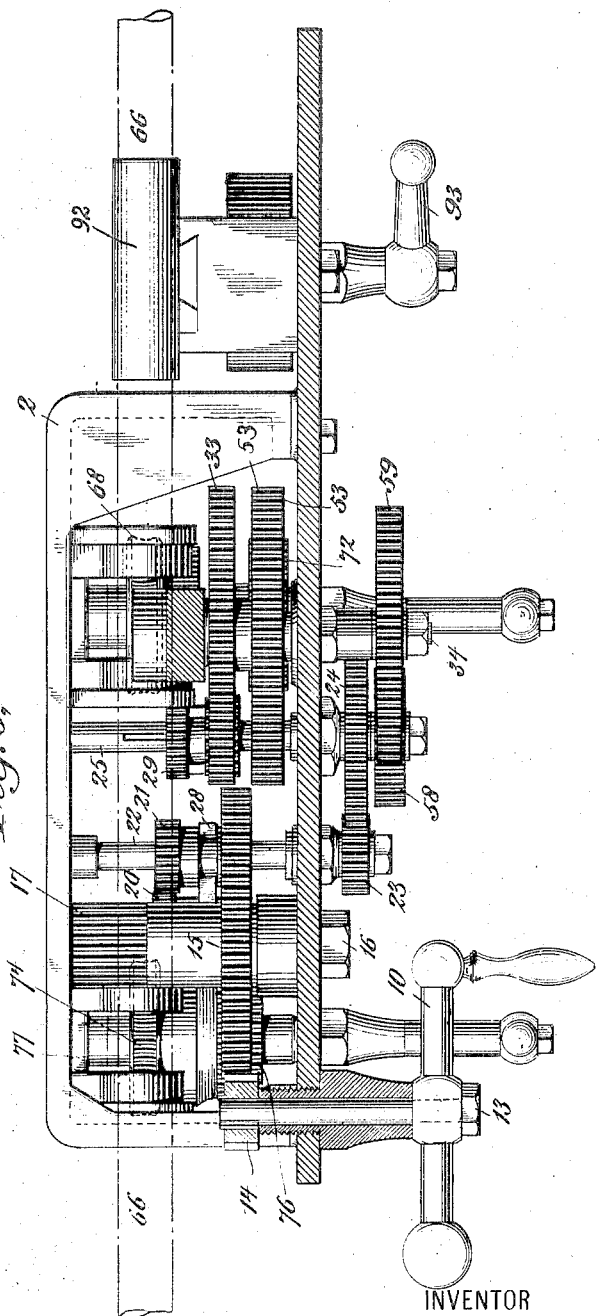
WITNESSES:
INVENTOR
Willard G. Bixby
BY
Kenyon & Kenyon
ATTORNEYS No. 802,366. PATENTED OCT. 24, 1905.
W. G. BIXBY.
LATHE.
APPLICATION FILED JUNE 7, 1899.
9 SHEETS—SHEET 6.
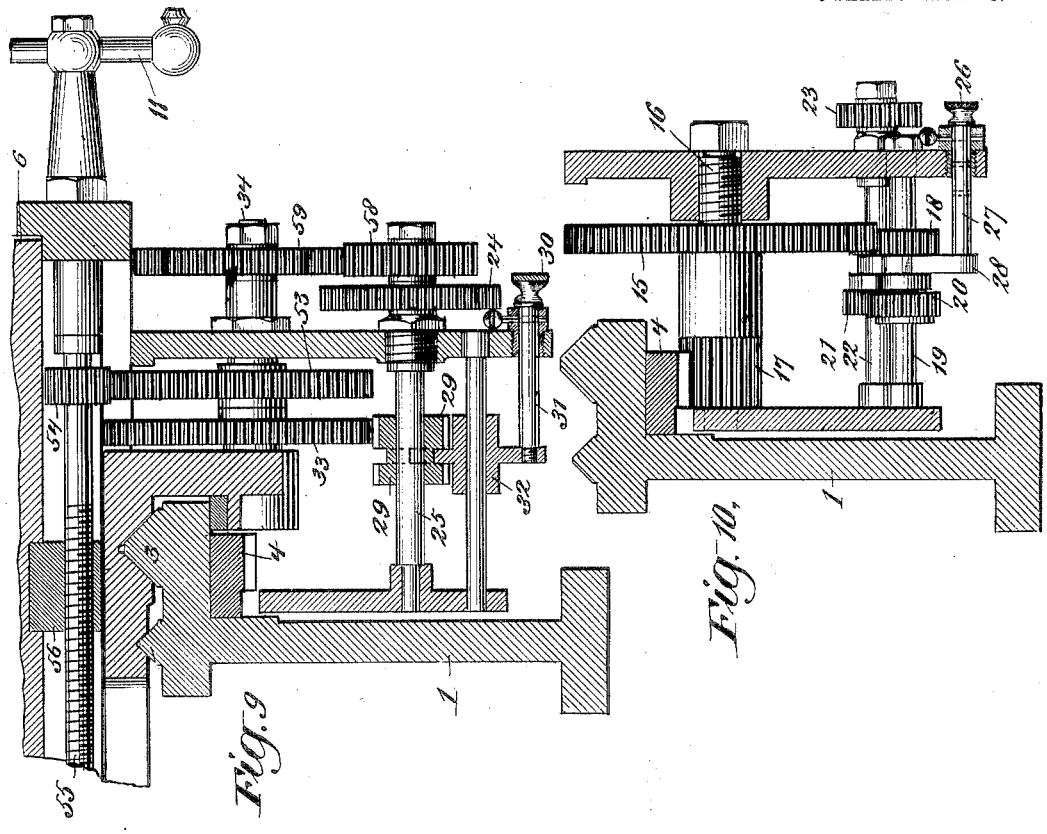
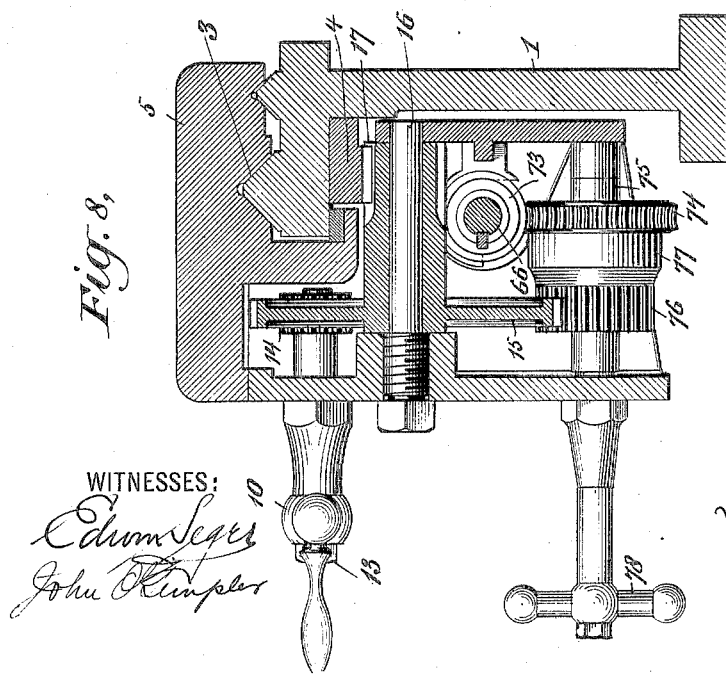
WITNESSES:
Edwin Seges
John Kempler
INVENTOR
Willard G. Bixby
BY
Kenyon & Kenyon
ATTORNEYS No. 802,366. PATENTED OCT. 24, 1905.
W. G. BIXBY.
LATHE.
APPLICATION FILED JUNE 7, 1899.
9 SHEETS—SHEET 7.
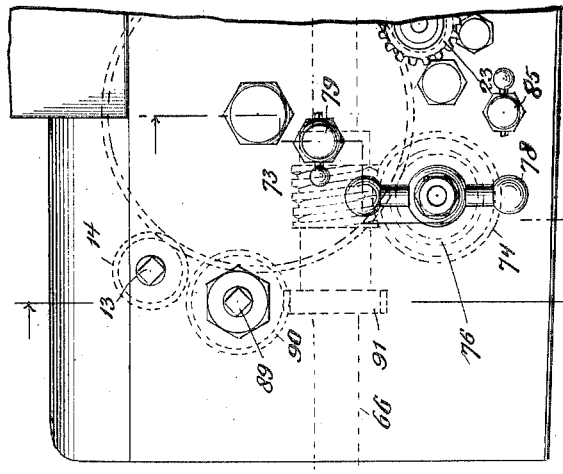
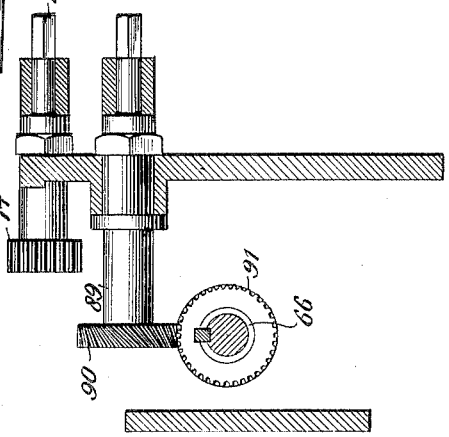
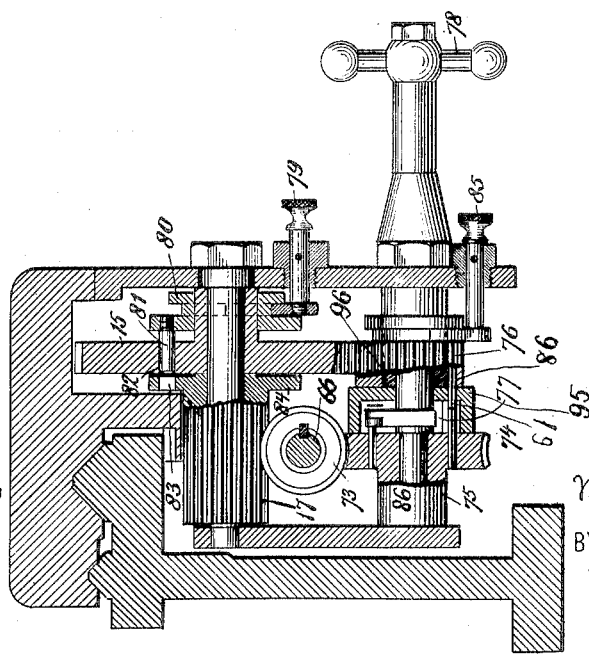
WITNESSES:
INVENTOR
Willard G. Bixby
BY
Kenyon & Kenyon
ATTORNEYS

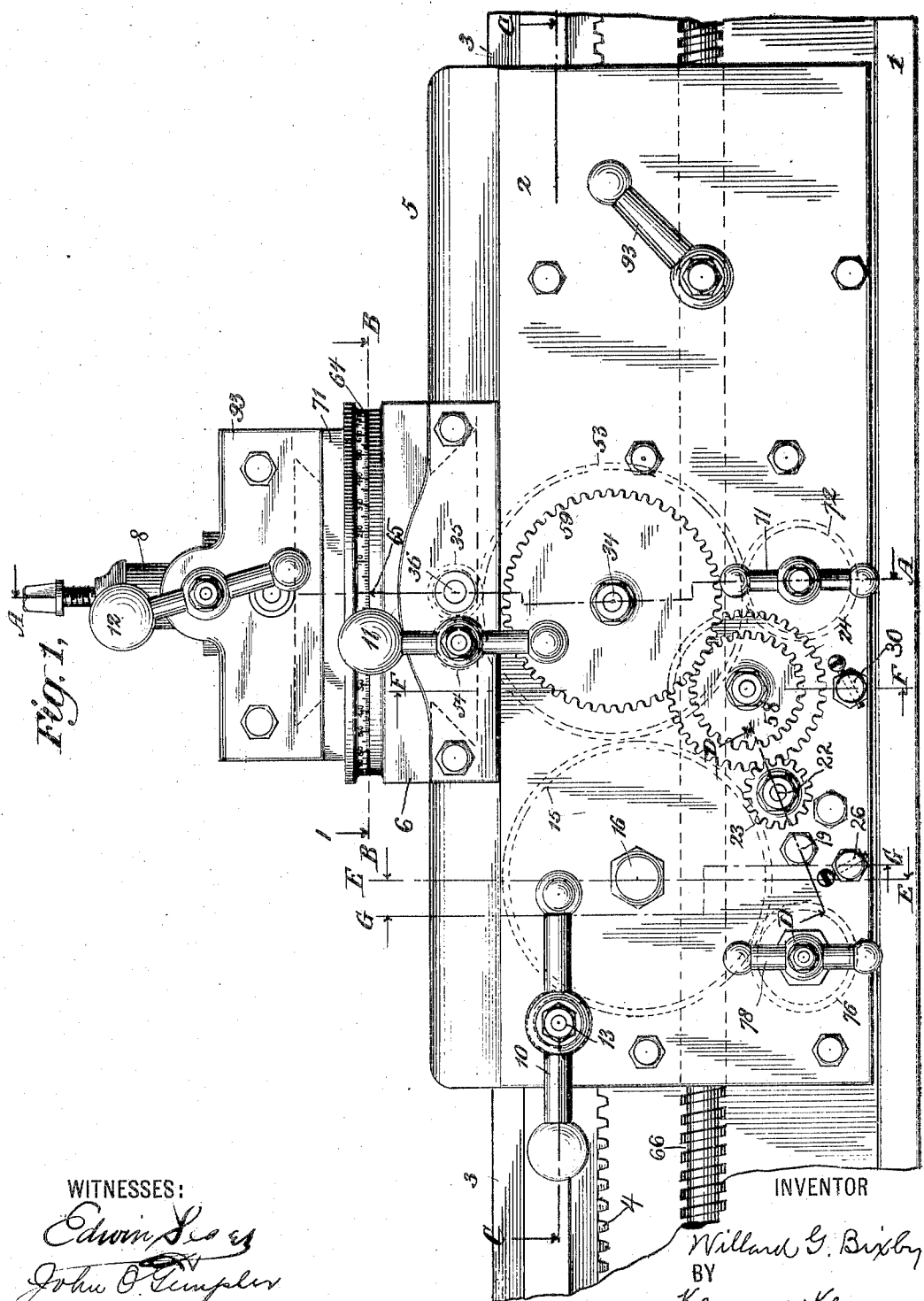

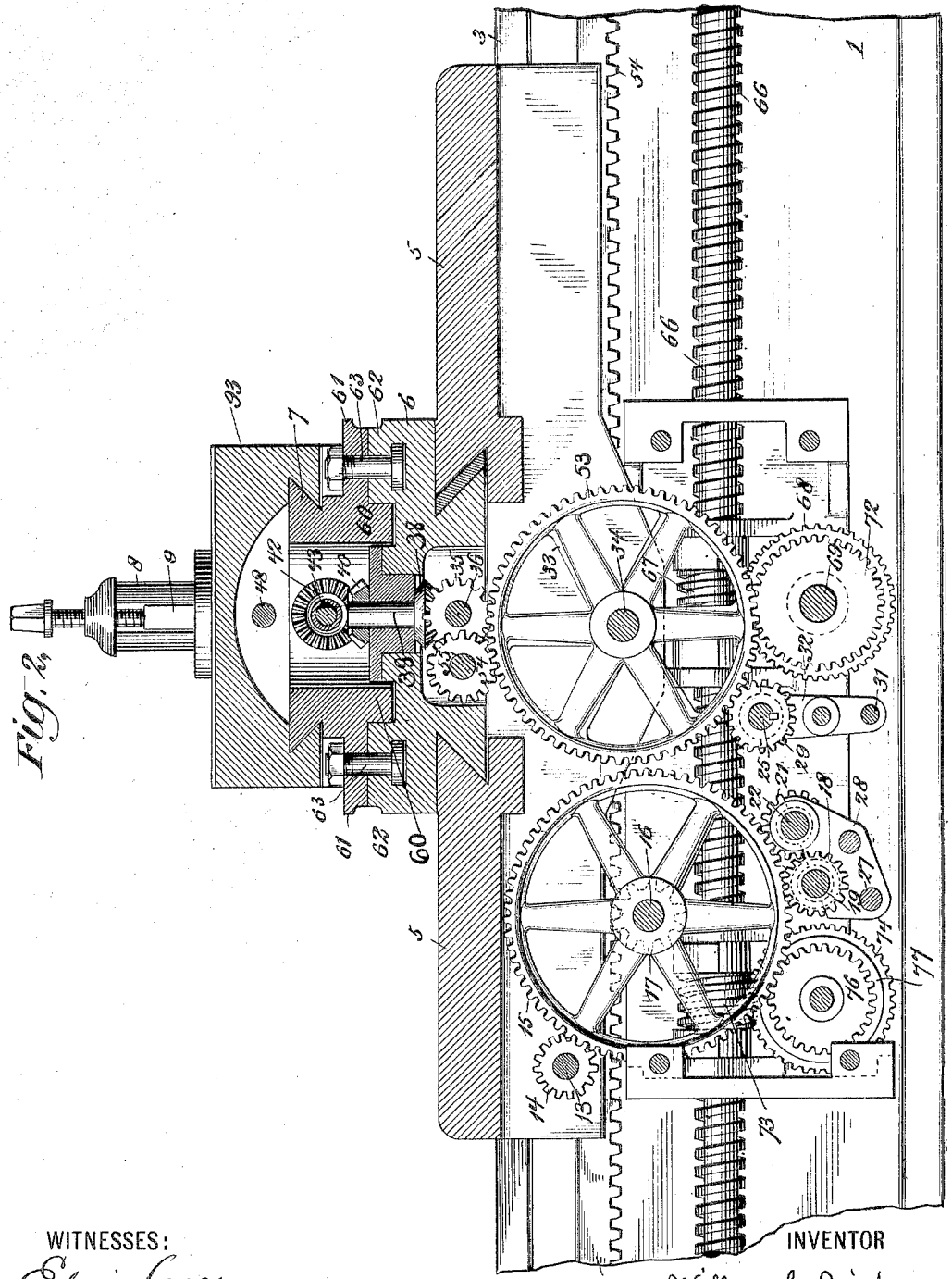

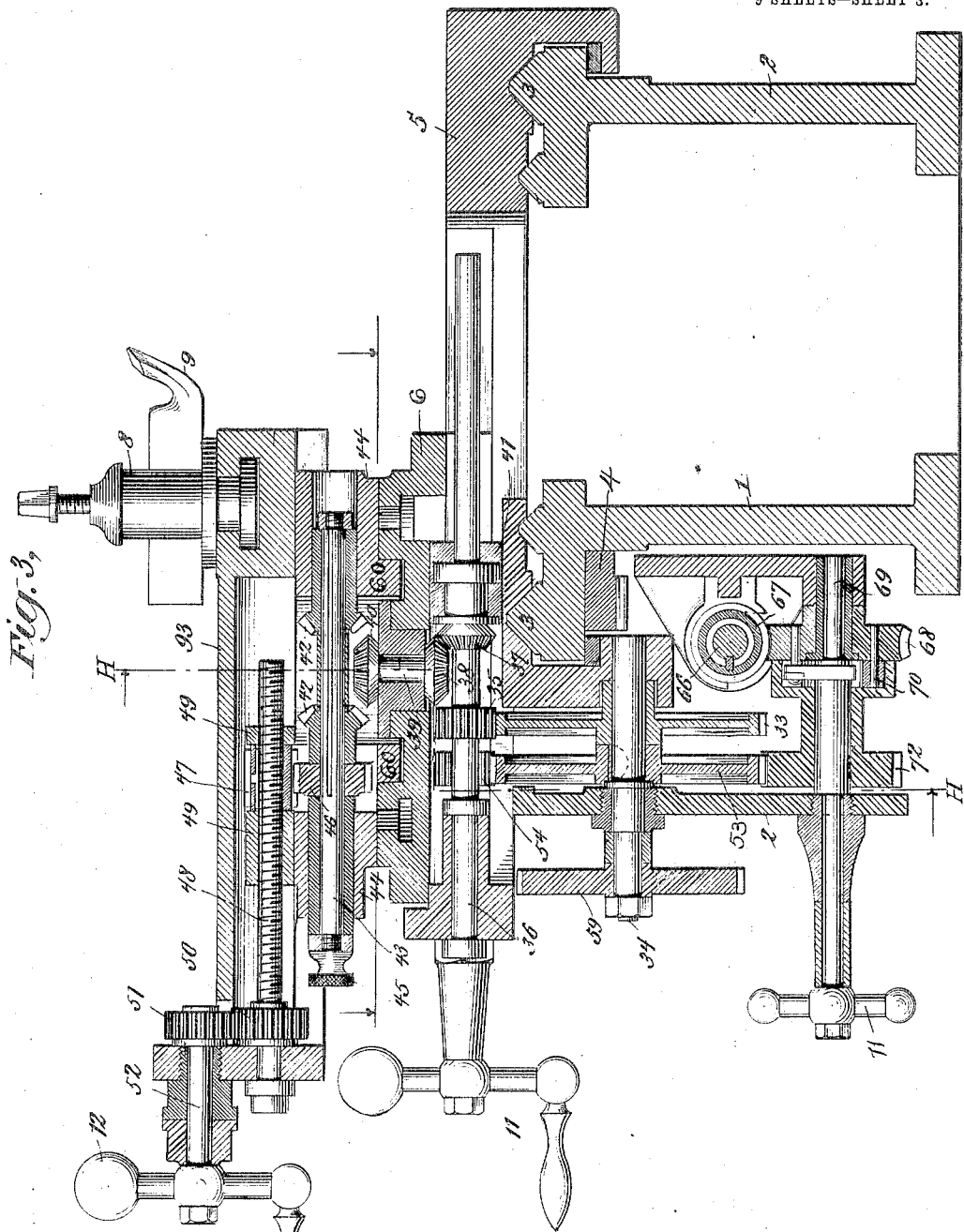

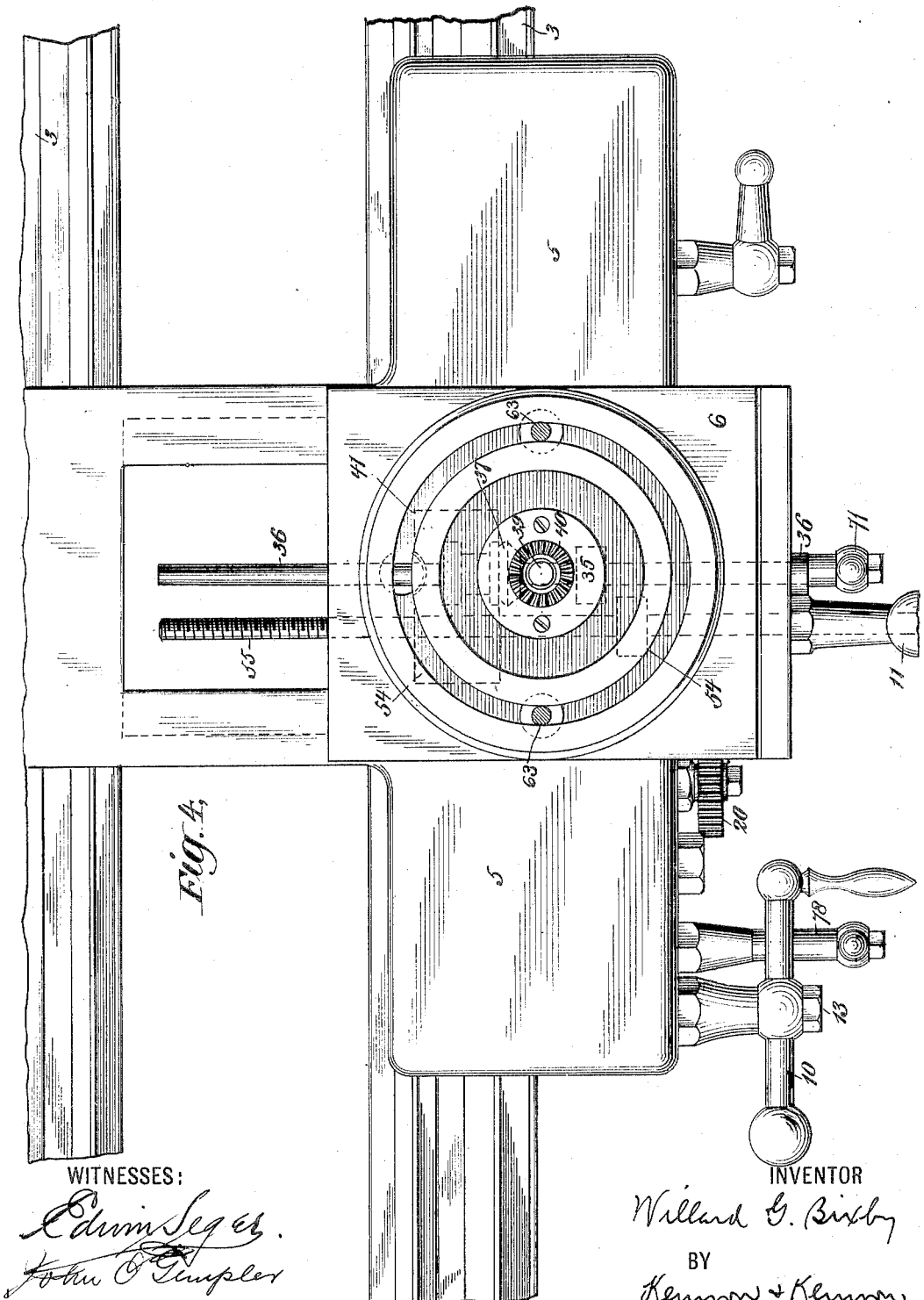

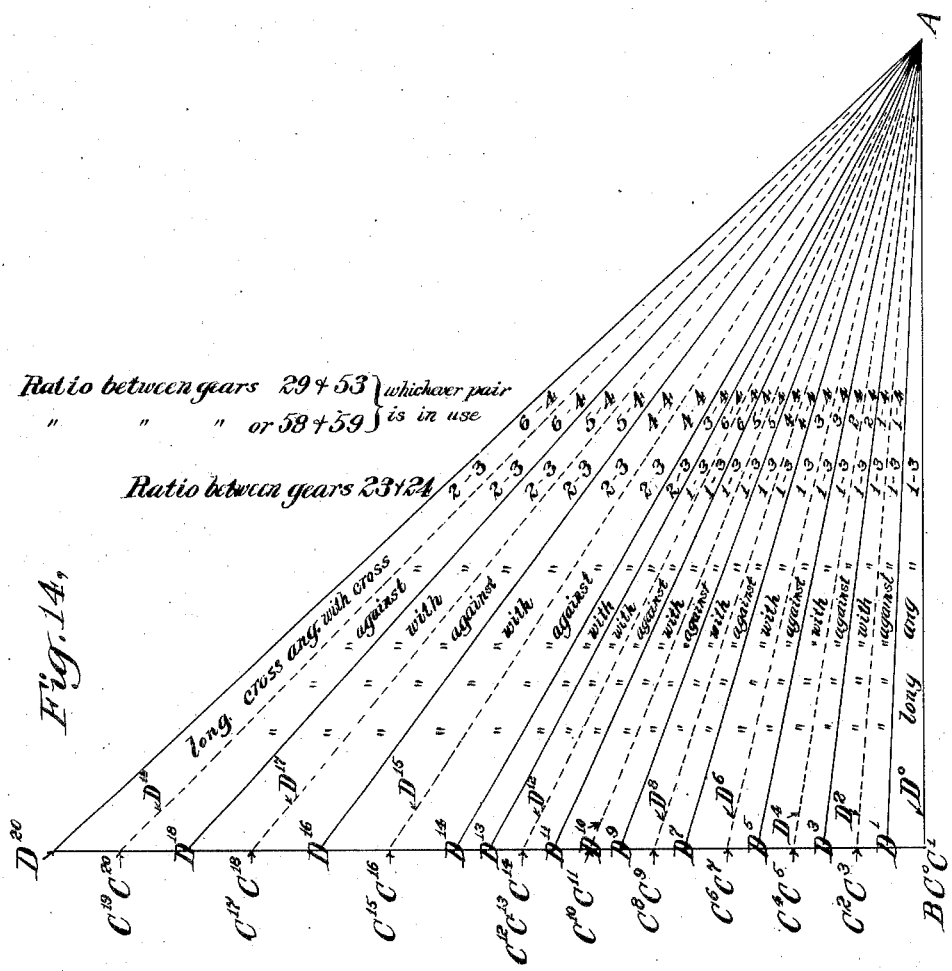

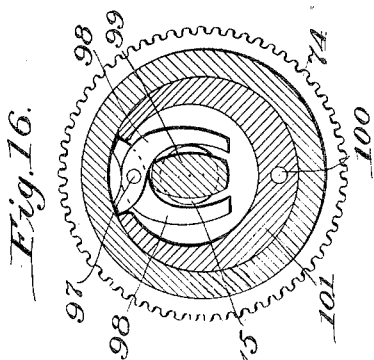
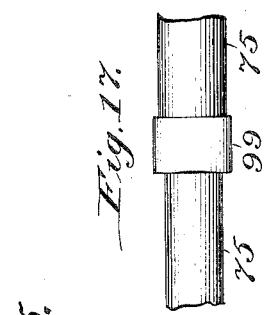
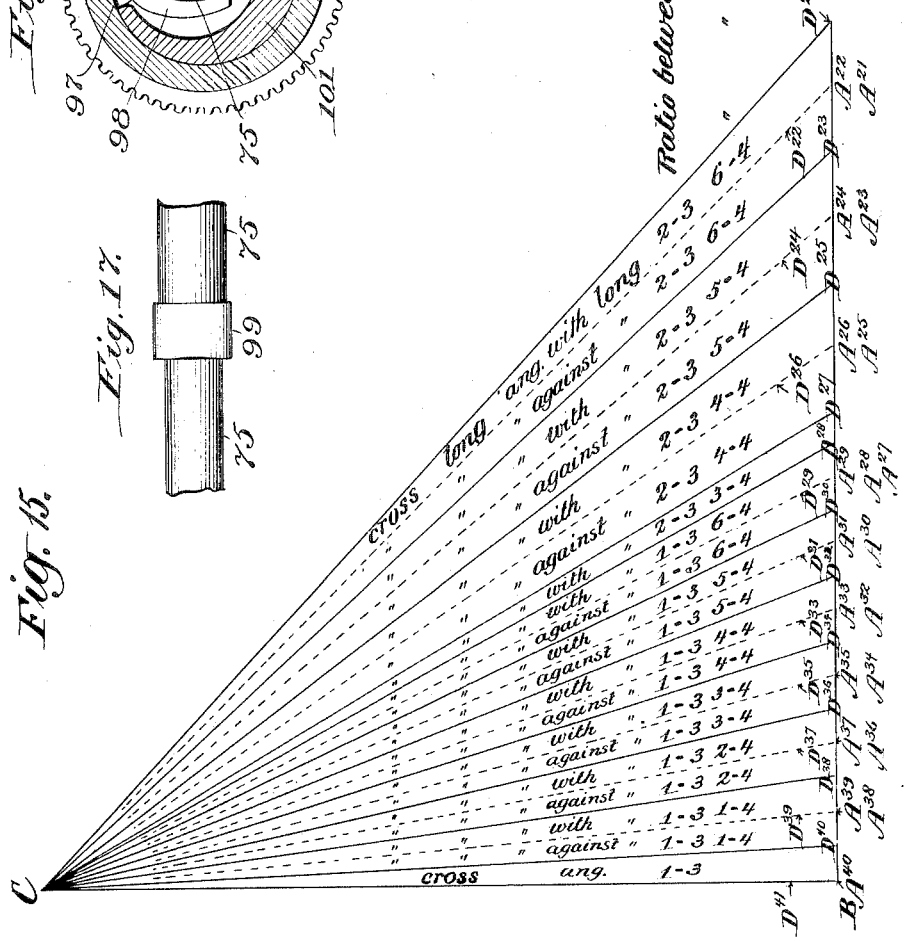

UNITED STATES PATENT OFFICE.

WILLARD G. BIXBY, OF NEW YORK, N. Y.

LATHE.

No. 802,366.

Specification of Letters Patent.

Patented Oct. 24, 1905.

Application filed June 7, 1899. Serial No. 719,672.

*To all whom it may concern:*

Be it known that I, WILLARD G. BIXBY, a citizen of the United States, and a resident of New York, in the county and State of New York, have invented new and useful Improvements in Lathes, of which the following is a specification.

My invention relates to lathes.

It has for its object to provide a lathe upon which tapers of any angle from zero to ninety degrees may be cut; also, to provide means for easily and accurately adjusting the lathe to cut a taper of any desired angle and for readily and quickly varying the angle of taper.

It consists of the novel devices and combinations herein shown and described.

Heretofore the angles at which tapers have been cut in lathes have generally been determined by guide-bars or equivalent devices or by setting the tail-stock out of alinement with the head-stock or by connecting the cross-feed with the longitudinal feed by means of gearing and by varying the angle of taper by substituting gear wheels of different ratios. In the first and second cases mentioned it is impossible to cut anything but small tapers. In the third case tapers of only a comparatively few angles can be cut, as a practically infinite number of varying sizes of gear-wheels would be needed to cut all angles. Moreover, in the second and third cases it is difficult, if not impossible, to obtain different angles with sufficient approximation to answer ordinary practical purposes without considerable and ofttimes expensive preliminary experimenting.

By means of my improvement I can cut tapers of any angle desired and of great length, the angle can be selected and accurately determined upon without prior trials or experimenting, and the change from one angle to any other angle is accomplished easily and quickly and with but few and slight changes in the mechanism.

In the drawings accompanying this specification and forming part thereof, and in which similar reference characters in the different figures represent corresponding parts, I have shown and will now proceed to describe the preferred form or embodiment of my improvement.

Figure 1 is a front elevation of a lathe embodying my invention. Fig. 2 is a vertical longitudinal section taken upon the line H H in Fig. 3 viewed as shown by the arrow. Fig. 3 is a vertical cross-section on the lines A A of Fig. 1 viewed as shown by the arrow. Fig. 4 is a horizontal section on the lines B B of Fig. 1 viewed as shown by the arrow. Fig. 5 is a horizontal section on the lines C C of Fig. 1 viewed as shown by the arrow with the gear-wheels showing in full. Fig. 6 is a similar section on the lines D D of Fig. 1 looking downward, showing the sliding gears in their extreme position away from the apron. Fig. 7 is a similar horizontal section to that of Fig. 6, only running through some of the gears and showing the sliding gears when drawn toward the apron. Fig. 8 is a vertical cross-section on the lines E E of Fig. 1 viewed as shown by the arrow. Fig. 9 is a vertical cross-section on the lines F F of Fig. 1 viewed as shown by the arrow. Fig. 10 is a vertical cross-section on the lines G G of Fig. 1 viewed as shown by the arrow. Figs. 11, 12, and 13 are detailed views showing a modification of part of the lathe, and Figs. 14 and 15 are diagrams illustrating the tapers produced by the different combinations of the different feeds. Figs. 16 and 17 show detail views of clutches.

I connect the angular feed with either the longitudinal feed or the cross-feed, or with both at once, by connections, preferably trains of gearing, so that the angular feed is driven by one or both of the other feeds at a predetermined rate of speed. When the longitudinal and angular feeds are connected and the angular feed is at right angles to the longitudinal, a taper will be cut dependent upon the ratio between the two feeds. This taper will diminish to nothing when the angular feed is parallel to the longitudinal feed, and any intermediate taper is obtained by setting the angular feed in the proper intermediate position. For the sake of cutting tapers of great length and for the purpose of reducing the error introduced into the taper cut by any possible error in setting the compound rest which gives the angular feed it is desirable to connect these feeds so that the angular feed is small in comparison with the longitudinal. In the diagram I have shown the ratio as one to twenty-four. This will give small tapers up to the taper marked AD' on diagram of Fig. 14. For greater tapers the cross-feed is set to give when connected to the longitudinal feed a series of fixed tapers represented by $AC^2 AC^4 AC^6 AC^8 AC^{10} AC^{12} AC^{15} AC^{17} AC^{19}$ on Fig. 14 and by $CA^{21} CA^{23}$, &c., to $CA^{38}$ on Fig. 15, and the angular feed is added or subtracted to get the tapers intermediate between the said fixed tapers. I preferably make parts of such trains of gearing removable and replaceable with other sets of gear-wheels, so as to vary the ratio of speed between the different feed mechanisms. In this way by means of a few sets of such removable and replaceable gear-wheels any angle from zero to ninety degrees may easily and readily be cut in the same lathe. I also preferably mount the compound rest so that it will swing, and I use with it a dial, so as quickly and easily to set the lathe to cut any desired angle of taper without previous experimenting.

1 is the framework of the lathe, and 2 the apron.

3 represents the V's upon which the carriage slides.

4 is the rack on the framework of the lathe; 5, the carriage; 6, the cross-slide; 7, the compound rest; 8, the tool-holder carried thereby, and 9 the tool mounted in the tool-holder.

My improved device may be driven either by hand or by power. I will first proceed to describe the parts as moved by hand.

10 is the handle for imparting longitudinal feed to the carriage by hand.

11 is the handle for moving the cross-slide by hand, and 12 is the handle for moving the top slide 93 of the compound rest.

I connect angular-feed mechanism for imparting motion to the top slide of the compound rest with longitudinal-feed mechanism for moving the carriage or with the cross-feed mechanism for moving the cross-slide, or preferably with both, so that both or all of the feed mechanisms may be driven from a single handle. The connections between the said feed mechanisms may be of any suitable kind. As shown they consist of trains of gearing, a train of gearing running from each feed mechanism and all meeting at a common point.

In cutting angles from zero up to forty-five degrees and slightly in excess thereof I preferably operate the lathe from the handle of the longitudinal feed—to wit, handle 10. In describing the trains of gearing which connect the three feed mechanisms together I will start from handle 10. The train of gearing running from this point to common center is as follows, viz: handle 10; shaft 13, on which the handle is mounted; gear 14, fast upon said shaft; gear 15 upon shaft 16, upon which shaft is also gear-wheel 17, which meshes with rack 4, thus giving the longitudinal feed to the carriage; gear-wheel 18, which is loose upon shaft 19, but is splined to the shaft, so that it is free to slide thereon, but turns therewith; gear 20, fast to shaft 19; gear-wheel 21, loose upon shaft 22, but splined thereto, so as to slide freely on the shaft, but to turn therewith; gear 23, fast to shaft 22, and gear 24 on shaft 25. Gear 24 is the common meeting-point for the trains of gearing connected with the different feed mechanisms. Gear-wheels 18 and 21 are slid along shafts 19 and 22, respectively, by means of button 26, (shown in Figs. 6, 7, and 10,) which connects by means of rod 27 and frame 28, which has parts encircling shafts 19 and 22, together with gear-wheels 18 and 21, the said gear-wheels being secured to the frame 28. By means of button 26 the two gears 18 and 21 are either pushed inward away from the apron into the position shown in Figs. 6 and 10, in which gear-wheel 21 receives motion through gear-wheel 20 and is driven in one direction, or the said gear-wheels can be pulled out into their extreme position near the apron, as shown in Fig. 7, in which position gear-wheel 21 meshes directly with gear-wheel 15, as shown in Fig. 2, in which case it is of course driven in the reverse direction. When button 26 is pushed half-way in, gear-wheel 21 meshes with neither gear-wheel 20 nor gear-wheel 15, in which position the mechanism for cutting tapers is disconnected or thrown out of operative position.

The train of gearing running to the angular-feed mechanism from gear-wheel 24 is as follows, viz: Upon shaft 25 is a sliding sleeve 29, which is splined to the shaft and rotates therewith, but is free to slide along the shaft. It has two gear-faces, as shown in Fig. 9. Button 30 through rod 31 and sleeve 32, which connects with sleeve 29, enables sleeve 29 to be slid along shaft 25. When sleeve 29 is in position shown in Fig. 9, one of its gear-faces meshes with gear-wheel 33, which runs loose on shaft 34. When sleeve 29 is in its other position, drawn toward the apron, the other gear-face of sleeve 29 meshes with gear-wheel 33, so that the latter gear-wheel is driven no matter what may be the position of sleeve 29. Gear 33 meshes with gear 35, fast on shaft 36. This shaft is mounted in the cross-slide. Upon the shaft is beveled gear 37, which meshes with beveled gear 38 on shaft 39, mounted in bearings in the cross-slide. Upon the other end of shaft 39 is beveled gear 40. Gear 37 is splined on shaft 36, is free to slide thereon, but rotates therewith. It is carried by block 41, which is secured to the cross-slide, block 41 slipping along shaft 36 with beveled gear 37. It is best shown in Fig. 4. 42 42 are two beveled gears fast on shaft 43. This shaft slides in bearings 44 in the lower part of the compound rest and has a button 45 at the end, by means of which it is pushed inward or pulled outward, so as to bring one or the other of the beveled gears 42 42 into contact with the beveled gear 40, and thus drive shaft 43 one way or the other. 46 is a gear-wheel secured to shaft 43 and meshing with gear-wheel 47. Gear 47 is splined to shaft 48, and so rotates the latter, and it is held from moving endwise with shaft 48 by means of stationary nut 49. This nut is screw-threaded in its interior, and as it is held from movement by the lower part of the compound rest to which it is secured the rotation of shaft 48 causes that shaft to move lengthwise through the nut. Shaft 48 is secured to the top slide of the compound rest, and thus by the rotation of shaft 48 an angular-feed movement is given to the tool-holder and tool. Gears 50 and 51, the latter mounted on shaft 52, are intended to connect shaft 48 with handle 12 in case it is desired to operate the angular-feed mechanism by hand separate from the other feed mechanism.

By means of the connection between the longitudinal-feed mechanism and the angular-feed mechanism above described both feed mechanisms may be driven from handle 10 and driven at a predetermined ratio of speed relative to each other dependent upon the ratios of the gear-wheels, racks, and screws to one another. These ratios can be easily varied, as will be presently described.

The connecting mechanism running from the common point (gear 24) to the cross-feed mechanism is as follows: When sleeve 29 is pulled into the position nearest to the apron, one part of the gear-face will then mesh with gear 53, fast on shaft 34, while the other gear-face of sleeve 29 will mesh with gear-wheel 33. Gear 53 meshes with gear 54, which is fast on the feed-screw 55 of the cross-slide. Nut 56 forms a part of block 41. This feed-screw is mounted in bearings in the frame of the carriage and passes through a nut 56, secured to the cross-slide. As feed-screw 55 rotates it moves the cross-slide one way or the other upon the carriage. Handle 11 is fast upon feed-screw 55 and is employed to move the cross-slide when it is desired to drive the cross-feed by hand independently of the other feed mechanisms. By the connections above described the angular feed mechanism is connected with the cross-feed mechanism as well as with the longitudinal-feed mechanism, so that all three feed mechanisms are driven from a common source of power—namely, the handle 10—and at predetermined ratios of speed relatively one to the other.

Instead of driving the cross-feed mechanism through sleeve 29 in the manner above described I sometimes prefer to drive it by means of gear-wheel 58, which is fast on shaft 25 and which meshes with gear-wheel 59, fast upon shaft 34. When the cross-feed mechanism is driven through gears 58 and 59, button 30 is pushed inward, so that the gear-face of sleeve 29 does not mesh with gear 53. When cross-feed mechanism is driven through sleeve 29, gear-wheels 58 and 59 are removed from their shafts. The object of driving the cross-feed mechanism sometimes through sleeve 29 and sometimes through gears 58 and 59 is to change the ratios of the gear connections, and thus to change the relative ratios of speed between the cross-feed and the other feeds, as will be hereinafter fully explained.

The compound rest I preferably mount so that it can be freely swung around, so that the direction of the angular feed can be easily changed. I accomplish this by means of a cylindrical portion 60 of the compound rest and a projecting portion 61, the former contained within a ring portion 62 on the cross-slide encircling the cylindrical portion 60 of the compound rest, the portion 61 resting upon the upper surface of ring 62, as shown in Fig. 2. The compound rest is locked in any position by means of bolts 63. For greater accuracy in the adjustment of the compound rest I preferably use a dial 64 with an indicating-point 65, one on the compound rest and the other on the cross-slide, as shown in Fig. 1.

By means of the specific connections, heretofore described, between the angular-feed mechanism, the cross-feed mechanism, and the longitudinal-feed mechanism and by means of the adjustment of the compound rest as above described I am enabled to easily and accurately set the machine to cut any angle desired within certain limitations. The reversal of the direction of feed of the angular-feed mechanism through the operation of button 45 assists in varying the angle of taper, as the movement of the angular feed in one direction would tend to increase the angle of taper which the cross-feed and the longitudinal-feed mechanisms would otherwise cut, whereas the movement of the angular-feed mechanism in the other direction would tend to decrease that angle.

The limitations of angle within which tapers may be cut by means of any fixed gearing connection between the three feed mechanisms may be varied by varying the ratios of the gearing or any part of it—as, for example, by making one or more sets of the gear-wheels removable and replaceable by other sets having different ratios or by the connection of additional gears—such as, for example, 58 and 59, above described. I will now proceed to describe how such changes may be made, and in so doing will begin with the smallest angle that can be cut upon the machine shown in the drawings.

In cutting the smallest angles upon the machine shown in the drawings I remove gear-wheels 58 and 59. In this operation sleeve 29 is in the position shown in Fig. 9 with button 30 pushed in, so that the gear-faces of sleeve 29 mesh only with gear-wheel 33 and not with gear-wheel 53. In this position the cross-feed is disconnected from the other parts and the angle of taper is determined by the longitudinal-feed and the angular-feed mechanisms alone. When it is desired to cut a little larger taper, button 30 is pulled outward, so that sleeve 29 now meshes with gear-wheel 53, as well as with gear-wheel 33. In this position of the parts the angular-feed mechanism is at first driven in the reverse direction to that of the cross-feed. When slightly larger tapers are desired, it is driven in the same direction with that of cross-feed. When a still steeper taper is desired, gear-wheels 58 and 59 are put upon their respective shafts. In this position button 30 is pushed inward into the position shown in Fig. 9, so that sleeve 29 does not mesh with gear-wheel 53. The ratio between gears 58 and 59 is different from that between the gear-face of sleeve 29 and gear 53, the ratio being increased, so as to drive the cross-feed more rapidly than before relative to the speed of the other feed mechanisms. For example, the ratio between gear-wheel 58 and 59 is forty to eighty, while that between 29 and 53 is one to four. This increase in the relative speed of the cross-feed enables tapers of a steeper angle to be cut. For still larger tapers the ratio between gears 58 and 59 is made as three to four. This is done, of course, by removing the set of gears 58 and 59 and putting in their place two other gears having a ratio of three to four. For larger tapers I change the ratio between the gears 58 and 59 as to four to four, then five to four, and, lastly, six to four. While cutting tapers up to the angle secured by the above arrangements the ratios of the other sets of gear-wheels have been maintained, as first shown in the drawings, and particularly the ratio between gears 23 and 24 have been preferably as one to three. At this point I preferably change the ratios between 23 and 24 in order to cut still steeper angles to two to three instead of one to three, and in order to compensate to a certain extent for this change I reduce the ratio between gears 58 and 59 to three to four. This makes the speed of the cross-feed the same as when the ratio between 23 and 24 was one to three and that between 58 and 59 was six to four. This nevertheless permits me to cut angles of a steeper grade, because the changes of ratio made before this last change were all between gears 58 and 59, and therefore effected only the speed of the cross-feed relative to the longitudinal feed, whereas the change in the ratio between gears 23 and 24 effects the speed of both the angular feed and the cross-feed relative to the longitudinal feed. This is due to the fact that gears 58 and 59 are in the train of gearing, which connects the longitudinal feed with the cross-feed and not the former with the angular feed, whereas gears 23 and 24 connect the longitudinal feed with both of the other feeds. To further increase the taper cut, I increase the ratio of gears 58 and 59 to four to four, five to four, then six to four. This enables me to cut an angle of forty-five degrees and slightly in excess thereof.

The changes in the connection or trains of gearing to enable angles of tapers to be cut up to and slightly in excess of forty-five degrees may of course be made in many other ways than those specifically enumerated above, and the ratio between other sets of gear-wheels other than those between gears 58 and 59 and 23 and 24 may be changed.

To cut tapers of an angle from forty-five degrees and slightly less up to ninety degrees, I vary the ratios of the different trains of gearing. I have found that in cutting tapers of such a large angle it is preferable to start from the cross-slide handle 11 and to substantially reverse the ratios of the trains of gearing and, in effect, to cut angles from ninety degrees downward approximately forty-five degrees. Thus in the gearing shown in the drawings for cutting smaller tapers the ratios of feed between the angular-feed, the cross-feed, and the longitudinal-feed mechanisms are respectively one twenty-fourth, one-twelfth, and one. For cutting tapers from ninety degrees and downward these ratios are made as follows—namely, one twenty-fourth for the angular, one-twelfth for the longitudinal, and one for the cross-feed. In other words, the cross-feed now occupies the position formerly occupied by the longitudinal feed, and the cross-feed handle 11 is selected as the starting-point for the same reason that the handle 10 of the longitudinal feed was selected as the starting-point for smaller tapers—namely, because the gearing is then in favor of such starting-point. In order to effect this, the ratio between gears 59 and 58 is made one to three and the ratio between gears 24 and 23 is made one to four. In order to conform the description as closely as possible to that heretofore given for cutting tapers from zero up to forty-five degrees, I will describe the cutting of tapers from forty-five degrees to ninety degrees as commencing with ninety degrees and coming downward. In cutting tapers from ninety degrees or a few degrees downward the cross-feed and angular feed alone are used. For tapers of a less degree of angle the longitudinal feed is then introduced, the angular feed first working against and then working with the longitudinal feed. Then the ratio between gears 24 and 23 is increased and is made two to four, then three to four, then four to four, then five to four, and, lastly, six to four. For still less tapers the ratio between gears 59 and 58 will be increased as to two to three and the ratio between gears 24 and 23 decreased to three to four, thus increasing the ratio of the angular and the longitudinal feed without effecting the ratio of the cross and the angular feeds. For still smaller tapers the ratio between gears 24 and 23 is increased to four to four, then five to four, and six to four, at which point tapers of forty-five degrees and a little less may be reached.

With each adjustment of the trains of gearing tapers of a number of degrees of angle can be cut by changing the direction of the angular feed, and by swinging the compound rest any angle whatever within the said limitations of angle may be easily and accurately cut. By varying the ratios of any one or more of the sets of gear-wheels of any one or more of the trains of gearing the said limitations of angle may be extended until any angle whatever from zero to ninety degrees may be cut by my improved device.

In Figs. 14 and 15 I have illustrated the limits of angle of tapers that can be cut under the varying conditions heretofore set forth and with the different ratios of gear-wheels heretofore explained. Fig. 14 is a diagram illustrating these limits of angle of taper from zero to forty-five degrees, and Fig. 15 is a diagram illustrating them from ninety degrees down to forty-five degrees. In these diagrams A B represents the longitudinal feed, and B C the cross-feed. In Fig. 14 A D represents the line of greatest taper cut in any given position, and in Fig. 15 C D represents the line of least taper cut in any given position. In these diagrams the numerals at the upper right-hand portions of the letters distinguish the extent of the different feeds in different positions. Thus in position 17 (see Fig. 14) the longitudinal feed is A B, the cross is B C$^{17}$, and the angular is C$^{17}$ D$^{17}$, or, what is the same thing, C$^{17}$ D$^{16}$. In this position the greatest taper cut is A D$^{17}$ and the least is A D$^{16}$. In this instance the ratio herein shown is the ratio of two to three between gears 23 and 24 and the ratio of five to four between gears 58 and 59. It will of course be understood that in all of the operations illustrated by Fig. 14 the longitudinal feed is the same namely, A B. In cutting tapers from zero to taper A D′ only the longitudinal and angular feed are used, as indicated in Fig. 14, with the ratio between gears 23 and 24 of one to three. By swinging the compound rest around any desired taper can be cut between zero and A D′. The cross-feed is then employed, and with the ratio of gears 23 and 24 as one to three and the ratio of gears 29 and 53 as one to four any tapers can be cut between A D′ and A D$^{3}$. With the angular feed working against the cross-feed any taper can be cut between A D$^{3}$ and A D′. With the angular feed working exactly along the line of taper taper A D$^{2}$ will be cut. With the angular feed working with the cross-feed any taper can be cut from A D$^{3}$ to A D$^{2}$. With the ratio between gears 23 and 24 the same as before, and with gears 58 and 59 substituted in place of 29 and 53, giving a ratio of two to four, tapers can be cut from A D$^{5}$ to A D$^{3}$, depending whether the angular works with or against the cross or along the line of taper. Similarly by changing the ratio between gears 58 and 59 to three to four any taper can be cut from A D$^{7}$ to A D$^{5}$. By changing the said ratio to four to four any taper can be cut from A D$^{9}$ to A D$^{7}$. By changing the same ratio to five to four tapers can be cut from A D$^{11}$ to A D$^{9}$. By changing the ratio to six to four tapers can be cut from A D$^{13}$ to A D$^{11}$. At this point the ratio between gears 23 and 24 is changed from one to three to two to three, and the ratio between gears 58 and 59 is changed from six to four to three to four. This doubles the angular feed, which was between C$^{13}$ to D$^{13}$, making it from C$^{14}$ to D$^{14}$, keeping the cross-feed the same as before. This enables tapers to be cut ranging from A D$^{14}$ to A D$^{13}$. Of course in this position tapers might be cut from A D$^{14}$ to A D$^{10}$; but for the sake of greater accuracy the former method is used. Next the ratio between gears 58 and 59 is increased to four to four, which enables tapers to be cut from A D$^{16}$ to A D$^{14}$. Next the same ratio is increased to five to four, giving a range from A D$^{18}$ to A D$^{16}$. Then the ratio is changed to six to four, giving a range from A D$^{20}$ to A D$^{18}$. This covers angles from zero up to forty-five degrees and a little beyond, A D$^{19}$ being forty-five degrees. In Fig. 15 I will, as above described, illustrate by starting with ninety degrees. In the operations illustrated in Fig. 15 the cross-feed substantially takes the place of the longitudinal feed in the operations illustrated in Fig. 14 and the longitudinal takes the place of the cross. With this exception the operations are substantially the same in both, except that the taper in Fig. 15 is diminishing from ninety degrees instead of increasing from zero. In the first operation, commencing from ninety degrees and proceeding downward, the cross and angular feeds alone are used, with the ratio between gears 59 and 58 as one to three. With these angles tapers can be cut from ninety degrees to C D$^{40}$. Next the longitudinal feed is connected with the ratio of gears 59 and 58, as before, and the ratio of the gears 24 and 23 as one to four. In this position tapers can be cut running from C D$^{40}$ to C D$^{38}$. With the angular feed working against the longitudinal tapers can be cut from C D$^{39}$ to C D$^{40}$. With the angular feed working with the cross tapers from C D$^{39}$ to C D$^{38}$ can be cut. By changing the ratio between the gears 24 and 23 to two to four tapers from C D$^{36}$ to C D$^{38}$ will be cut. Similarly by changing the same ratio to three to four the range will be from C D$^{34}$ to C D$^{36}$, and by changing it to four to four it will run from C D$^{32}$ to C D$^{34}$. By changing it from five to four and then six to four the range will be extended from C D$^{30}$ to C D$^{32}$ in the one case and from C D$^{28}$ to C D$^{30}$ in the other. At this point the ratio between gears 59 and 58 is changed to two to three, and that between gears 24 and 23 is reduced to three to four. This doubles the angular feed relative to the cross, leaving the ratio between the longitudinal and the cross the same. In this position angles can be cut from C D$^{27}$ to C D$^{28}$. Then the ratio of gears 24 and 23 is gradually increased, first to four to four, then to five to four, then to six to four, enabling tapers to be cut from $CD^{25}$ to $CD^{27}$ in the first case, $CD^{23}$ to $CD^{25}$ in the second case, and from $CD^{21}$ to $CD^{23}$ in the last case. This covers all angles from ninety degrees down to forty-five degrees and a little less, as $CD^{22}$ represents a taper of forty-five degrees.

Heretofore I have described my devices as driven by hand. They may, if desired, be driven by power, and in order to illustrate the means for thus driving them I have shown and will now proceed to describe one form of such means.

66 is an ordinary lead-screw. This screw is slotted its entire length, and upon it is placed a worm 67. By the ordinary spline and feather this worm is caused to turn with the screw, but is free to move lengthwise of the same. It is secured to the carriage and moves with it. This worm gears into worm-wheel 68, turning loosely on its shaft 69. (See Fig. 3.) 70 is a clutch of any ordinary construction, and 71 is a clutch-handle therefor. 72 is a gear-wheel mounted upon the same shaft 69. By the operation of clutch-handle 71 and through clutch 70 worm-wheel 68 is connected with or disconnected from gear-wheel 72. The latter gear-wheel meshes with gear-wheel 53, which drives the cross-feed mechanism. Lead-screw 66 is driven from any suitable source of power. Thus by means of handle 71 the cross-feed mechanism is driven by power. The longitudinal-feed mechanism is driven by power in a similar way by means of a worm 73, splined upon screw 66 and secured to the carriage in the same way that worm 67 is. Worm 73 meshes with worm-wheel 74, turning loosely on shaft 75. Worm-wheel 74 is connected with or disconnected from gear-wheel 76 on the same shaft by means of clutch 77 and its handle 78 in the manner above described in reference to worm 67. The clutch 77 is clearly shown by reference to Figs. 11 and 16, Fig. 11 showing this clutch in longitudinal section, and Fig. 16 showing a section of the same taken through line A B on Fig. 11. This clutch 77 consists of a split ring 101, secured to worm-wheel 74 by pin 100, and levers 98, which are loosely pivoted on pin 97, which is fast in worm-wheel 74. Shaft 75 has loosely connected upon it worm-wheel 74 and casing 95. In the center of shaft 75 is cut a cam 99, which when the shaft 75 is rotated causes the levers 98 to be spread apart, and this spreads ring 101 and by means of friction connects ring 101 with casing 95. Gear 76 meshes with gear 15. Thus through handle 78 the longitudinal feed mechanism is driven by power.

In the improved lathe shown in Figs. 1 to 10, inclusive, and described above the carriage has been driven through rack 4 and pinion 17. For some purposes and at some times it is desirable to drive the carriage by the means of an ordinary lead-screw, such as screw 66. When this is done, the mechanism shown in Figs. 1 to 10 for driving the carriage and connecting the different feed mechanisms must be varied in some particulars, and I have shown in Figs. 11 to 13 devices as thus modified. In Fig. 11 I show mechanism by means of which the carriage can be driven either through rack 4 and pinion 17 or by means of the lead-screw 66. When the carriage is driven from the lead-screw it is done by means of an ordinary open-and-shut nut 92, (shown in Fig. 5,) opened and closed by lever 93. When the carriage is thus driven, it is necessary to disconnect pinion 17 from the driving mechanism. This I accomplish, as shown in Fig. 11, by a clutch arrangement which in one position fastens pinion 17 to gear 15 and in the other position disconnects them, so that pinion 17 in the latter case is not driven when gear 15 rotates. This clutch arrangement consists of a button 79, a sleeve 80, with which the button is connected, and a pin 81, projecting from the sleeve through an opening 82 in gear 15 and adapted when button 79 is pushed inward to enter an opening 83 in a disk 84, which forms part of pinion 17. When button 79 is pulled outward, pinion 17 and gear 15 are disconnected. When the longitudinal feed is driven from lead-screw 66, I connect the longitudinal-feed mechanism with the cross and angular feed mechanisms through worm 73, splined upon lead-screw 66 and secured to the carriage, worm-wheel 74, loose upon shaft 75, clutch 77, gear 76, which meshes with gear 15. It is necessary to make the connection between worm-wheel 74 and gear-wheel 76 a positive one in order to preserve the proper ratio of feed between the different feed mechanisms. To accomplish this I preferably provide a pin 86, which forms part of gear 76 and which is adapted to take into an opening 94 in clutch 77. 95 is a casing surrounding the clutch and is loose upon shaft 75. Gear-wheel 76 is splined to the hub 96 of casing 95. When button 85 is pushed inward, worm-wheel 74 and gear-wheel 76 are positively connected to each other, and when pulled outward they are disconnected.

The operation of cutting tapers in the first construction (shown in Figs. 1 to 10) will be as follows: After the parts are connected and set in proper manner and the tool is in the proper position for taking a cut and it is desired to feed by power the proper clutch-handle—for example, 78—would be turned slightly, and thus worm-wheel 74 would be connected to gear 76 and the feeds would then work together and a taper-surface would be cut. When the tool had moved as far as was desired, the clutch-handle 78 would be given a slight turn in the opposite direction to that it was turned before, and the power-feed would thus be disconnected. The carriage and all the connected parts would then be moved back to their former positions. This is accomplished simply by turning handle 10. When the longitudinal feed is by means of the lead-screw, the open-and-shut nut 92 would be closed and the pinion 17 disconnected from gear 15 and worm-wheel 74 positively connected to gear 76. After the tool had been set in the proper position for taking a cut the power-feed would be thrown in by starting the lead-screw rotating. This is done by a small handle provided in all lathes for that purpose. The position of this handle varies greatly, and as every lathe is provided with it it is for the sake of clearness not shown here. After the tool has taken as long a cut as is desired the feed is thrown out, by means of the handle, for stopping or starting the rotation of the lead-screw. The tool is then returned to its former position by means of a handle placed on shaft 89. This by means of the spiral gears 90 and 91 rotates the lead-screw in the reverse direction, and so returns all parts to their former position.

In my improved lathe any inaccuracy in setting the compound rest affects the angle of tapers to only a very slight extent. When an ordinary lathe provided with a compound rest is set to cut tapers by using the compound rest alone, any inaccuracy in setting the latter affects the taper just so much, while with my improved lathe the error is very much less, and with the particular arrangement shown in the drawings the error in the taper is only one-twelfth to one twenty-fourth of the error in setting the compound rest. The case shown here shows the regular cross-feed screw used when needed for cutting tapers.

Many modifications may be made in the device shown in the drawings herein without departing from my invention. Thus the form of or connections between the feed mechanisms may be widely varied. The relative ratios of speed of the different feed mechanisms may be obtained in different ways as long as the angular-feed mechanism is connected with one or both the other feed mechanisms so as to be driven from a common source of power and at a predetermined ratio of speed relative to each other.

What I claim as new, and desire to secure by Letters Patent, is—

1. In a lathe the combination of a cross-slide, mechanism for moving the same, crosswise of the lathe, a compound rest mounted upon the cross-slide, a tool mounted upon the compound rest and adapted to move thereon, mechanism for moving the tool along the compound rest, and connections between the said mechanisms for moving the cross-slide and the tool, whereby one of the said mechanisms may be driven at a predetermined ratio of speed relative to each other.

2. In a lathe the combination of a cross-slide, mechanism for moving the same crosswise of the lathe, a compound rest mounted upon the cross-slide, and adapted to swing thereon and means adapted to lock said compound rest in any position to which it may be swung, a tool mounted upon the compound rest and adapted to move thereon, mechanism for moving the tool along the compound rest, and gear connections between the said mechanisms for moving the cross-slide and the tool, whereby one of the said mechanisms may be driven by the other at a predetermined ratio of speed relative to each other.

3. In a lathe the combination of a cross-slide, mechanism for moving the same crosswise of the lathe, a compound rest mounted upon the cross-slide, and adapted to swing thereon and to be locked in any position to which it may be swung, and means for locking said compound rest, a tool mounted upon the compound rest and adapted to move thereon, mechanism for moving the tool along the compound rest, and gear connections between the said mechanism for moving the cross-slide and the tool, all or part of which connections are removable and replaceable, whereby one of the said mechanisms may be driven by the other at a predetermined but adjustable ratio of speed relative to each other.

4. In a lathe the combination of a cross-slide, mechanism for moving the same crosswise of the lathe, a compound rest mounted upon the cross-slide and adapted to move thereon, mechanism for moving the tool along the compound rest, mechanism for moving the cross-slide longitudinally of the lathe, and connections between the said mechanisms for moving the tool and for moving the cross-slide crosswise and longitudinally of the lathe, whereby one of the said mechanisms may be driven by the other at a predetermined ratio of speed relative to each other.

5. In a lathe the combination of a cross-slide, mechanism for moving the same crosswise of the lathe, a compound rest mounted upon the cross-slide, and adapted to swing thereon and to be locked in any position to which it may be swung, and means for locking said compound rest, a tool mounted upon the compound rest and adapted to move thereon, mechanism for moving the tool along the compound rest, mechanisms for moving the cross-slide longitudinally of the lathe, and gear connections between the said mechanisms for moving the tool and for moving the cross-slide crosswise and longitudinally of the lathe, all or part of which connections is removable and replaceable, whereby one of the said mechanisms may be driven by the other at a predetermined but adjustable ratio of speed relative to each other.

6. In a lathe the combination with a tool, of angular-feed mechanism, longitudinal-feed mechanism and cross-feed mechanism, connections between the said angular, longitudinal and cross feed mechanisms, consisting of a train of gearing running from each feed mechanism and meeting at a common point whereby one of the said mechanisms may be driven by the other at a predetermined ratio of speed relative to one another.

7. In a lathe the combination with a tool, of angular-feed mechanism, longitudinal-feed mechanism and cross-feed mechanism, gear connections between the said angular, longitudinal and cross feed mechanisms, consisting of a train of gearing running from each feed mechanism and meeting at a common point, all or part of which connections are removable and replaceable, whereby one of the said mechanisms may be driven by the other at a predetermined but adjustable ratio of speed relative to one another.

8. In a lathe the combination with a tool, of angular-feed mechanism, longitudinal-feed mechanism and cross-feed mechanism, connections between the said angular, longitudinal and cross feed mechanisms, consisting of a train of gearing running from each feed mechanism and meeting at a common point, means for disconnecting the train of gearing of the cross-feed mechanism at will from the trains of gearing running from the other feed mechanisms, whereby the said angular-feed and longitudinal-feed mechanisms may be driven with or without the cross-feed mechanism at a predetermined ratio of speed relative to one another.

9. In a lathe the combination with a tool, of angular-feed mechanism, longitudinal-feed mechanism and cross-feed mechanism, gear connections between the said angular, longitudinal and cross feed mechanisms, consisting of a train of gearing running from each feed mechanism and meeting at a common point, all or part of which connections are removable and replaceable, means for disconnecting the train of gearing of the cross-feed mechanism at will from the trains of gearing running from the other feed mechanisms, whereby the said angular-feed and longitudinal-feed mechanisms may be driven at a predetermined but adjustable ratio of speed relative to one another.

10. In a lathe the combination with a tool, of angular-feed mechanism, longitudinal-feed mechanism and cross-feed mechanism, connections between the said angular, longitudinal and cross feed mechanisms, consisting of a train of gearing running from each feed mechanism and meeting at a common point means for disconnecting the train of gearing of the longitudinal-feed mechanism at will from the trains of gearing running from the other feed mechanisms, whereby the said angular-feed and cross-feed mechanisms may be driven with or without the longitudinal-feed mechanism at a predetermined ratio of speed relative to one another.

11. In a lathe the combination with a tool, of angular-feed mechanism, longitudinal-feed mechanism and cross-feed mechanism, gear connections between the said angular, longitudinal and cross feed mechanisms, consisting of a train of gearing running from each feed mechanism and meeting at a common point, means for disconnecting the train of gearing of the longitudinal-feed mechanism at will from the trains of gearing running from the other feed mechanisms, all or part of which connections are removable and replaceable, whereby the said angular-feed and cross-feed mechanisms may be driven at a predetermined but adjustable ratio of speed relative to one another.

In testimony whereof I have signed my name to this specification in the presence of two subscribing witnesses.

WILLARD G. BIXBY.

Witnesses:
 EDWIN SEGER,
 GEO. W. MILLS, Jr.